(12) United States Patent
Takahashi et al.

(10) Patent No.: US 8,012,282 B2
(45) Date of Patent: Sep. 6, 2011

(54) METHOD FOR FABRICATING DRIVE BELT

(75) Inventors: Shinji Takahashi, Kobe (JP); Masahide Naya, Kobe (JP); Takehiro Hayashi, Kobe (JP); Kentarou Sanematsu, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 340 days.

(21) Appl. No.: 12/278,770

(22) PCT Filed: Dec. 5, 2007

(86) PCT No.: PCT/JP2007/073461
§ 371 (c)(1),
(2), (4) Date: Aug. 7, 2008

(87) PCT Pub. No.: WO2008/069229
PCT Pub. Date: Jun. 12, 2008

(65) Prior Publication Data
US 2009/0032177 A1    Feb. 5, 2009

(30) Foreign Application Priority Data

Dec. 5, 2006 (JP) .................. 2006-328201

(51) Int. Cl.
*B29D 29/00* (2006.01)
(52) U.S. Cl. ........ 156/137; 156/138; 156/139; 156/140; 156/141
(58) Field of Classification Search .................. 156/137, 156/138, 139, 140, 141
See application file for complete search history.

(56) References Cited

U.S. PATENT DOCUMENTS

| 1,432,973 | A | * | 10/1922 | Delzell | 156/142 |
| 4,150,581 | A | * | 4/1979 | Walters | 156/137 |
| 5,415,961 | A | * | 5/1995 | Yu et al. | 430/58.05 |

FOREIGN PATENT DOCUMENTS

| JP | 5-14843 Y | 4/1993 |
| JP | 2000-334856 A | 12/2000 |
| JP | 2001-121619 A | 5/2001 |
| JP | 2003-222194 A | 8/2003 |
| JP | 2006009946 A | * | 1/2006 |
| JP | 2006-112610 A | 4/2006 |

OTHER PUBLICATIONS

English machine translation of JP 2006009946, retrieved from JPO database Aug. 10, 2010.*
English machine translation of JP 2006112610, retrieved from JPO database Aug. 10, 2010.*
English translation of Written Opinion of the International Search Authority for PCT/JP2007/073461, Aug. 6, 2009.*
JPO English machine translation of JP 2001-121619, retrieved from JPO Jan. 27, 2011.*

* cited by examiner

*Primary Examiner* — Joseph Del Sole
*Assistant Examiner* — Timothy Kennedy
(74) *Attorney, Agent, or Firm* — Roberts Mlotkowski Safran & Cole, P.C.

(57) ABSTRACT

A method for fabricating a drive belt includes: a cylindrical rubber formation step of forming a cylindrical rubber by roundly joining an uncrosslinked rubber sheet (31); and a mold covering step of covering a cylindrical mold with the cylindrical rubber formed in the cylindrical rubber formation step. A mark hot-transfer sheet (35) is adhered by hot pressing to the juncture of the cylindrical rubber to cover the juncture on the inside of the cylindrical rubber.

8 Claims, 5 Drawing Sheets

US 8,012,282 B2

METHOD FOR FABRICATING DRIVE BELT

TECHNICAL FIELD

This invention relates to a method for fabricating a drive belt.

BACKGROUND ART

In fabricating a friction drive belt exposing its rubber part, normally, component materials of the belt are set on the outer periphery of a cylindrical mold in order from a component material for an outermost belt component. Specifically, the belt component materials are set on the outer periphery of the cylindrical mold by laying them one on another in order of a woven fabric constituting a top fabric, an uncrosslinked adhesion rubber, a twisted yarn constituting a cord, another uncrosslinked adhesion rubber and an uncrosslinked compression rubber. Known as a method for setting an uncrosslinked rubber on the cylindrical mold in such a case is a method of forming an uncrosslinked rubber into a cylindrical rubber and fitting it onto the cylindrical mold.

For example, Patent Document 1 discloses a drive belt fabrication method including: a fabric setting step of fitting a cylindrical fabric subjected to adhesion treatment with rubber cement onto a cylindrical mold; a reinforcing cord setting step of spirally winding a reinforcing cord around the cylindrical mold covered with the cylindrical fabric; and a cylindrical rubber setting step of fitting a cylindrical rubber made of an unvulcanized rubber composition onto the cylindrical mold around which the reinforcing cord is set.

Patent Document 2 discloses a belt fabrication method in which an unvulcanized rubber sheet is heated and pressed with both its ends brought into abutment by a pressing plate to soften it and join both its ends, thereby forming it into a cylindrical form having not level difference at least on one side of the juncture of the ends, and the cylindrical rubber is fitted onto a mold and then vulcanized.

Meanwhile, in belt drive systems in which a drive belt is wrapped, with its back face inside, around a resin-made flat pulley, a problem arises that the flat pulley is worn out by the top fabric of the belt. Therefore, for the belt drive systems, drive belts have been recently employed that have back faces made of short fiber-containing rubber and no top fabrics. In fabricating such a drive belt, a short fiber-containing, uncrosslinked rubber sheet is roundly joined at both ends to form a cylindrical rubber so that the direction orthogonal to the orientation of short fibers is the circumferential direction of the belt, and the cylindrical rubber is set directly around the outer periphery of a cylindrical mold. In this case, in order that the cylindrical rubber does not get wrinkled when a twisted yarn constituting a cord is wound around it, the cylindrical rubber must be formed with a size that causes no sag from the cylindrical mold. Particular attention is needed when the cylindrical rubber is made of a low-tack rubber material.

However, when the cylindrical rubber is formed to cause no sag from the cylindrical mold, it receives a circumferential tension, which may break the joining at the rubber juncture.
Patent Document 1: Published Japanese Patent Application No. 2000-334856
Patent Document 2: Published Japanese Patent Application No. 2001-121619

DISCLOSURE OF THE INVENTION

A method for fabricating a drive belt according to the present invention includes a cylindrical rubber formation step of forming a cylindrical rubber by roundly joining an uncrosslinked rubber sheet and a mold covering step of covering a cylindrical mold with the cylindrical rubber formed in the cylindrical rubber formation step, and further includes a sheet hot-pressing step of adhering a mark hot-transfer sheet to the juncture of the cylindrical rubber by hot pressing so that the mark hot-transfer sheet covers the juncture on the inside of the cylindrical rubber.

BEST MODE FOR CARRYING OUT THE INVENTION

An embodiment of the present invention will be described below in detail with reference to the drawings.

Figure 1:
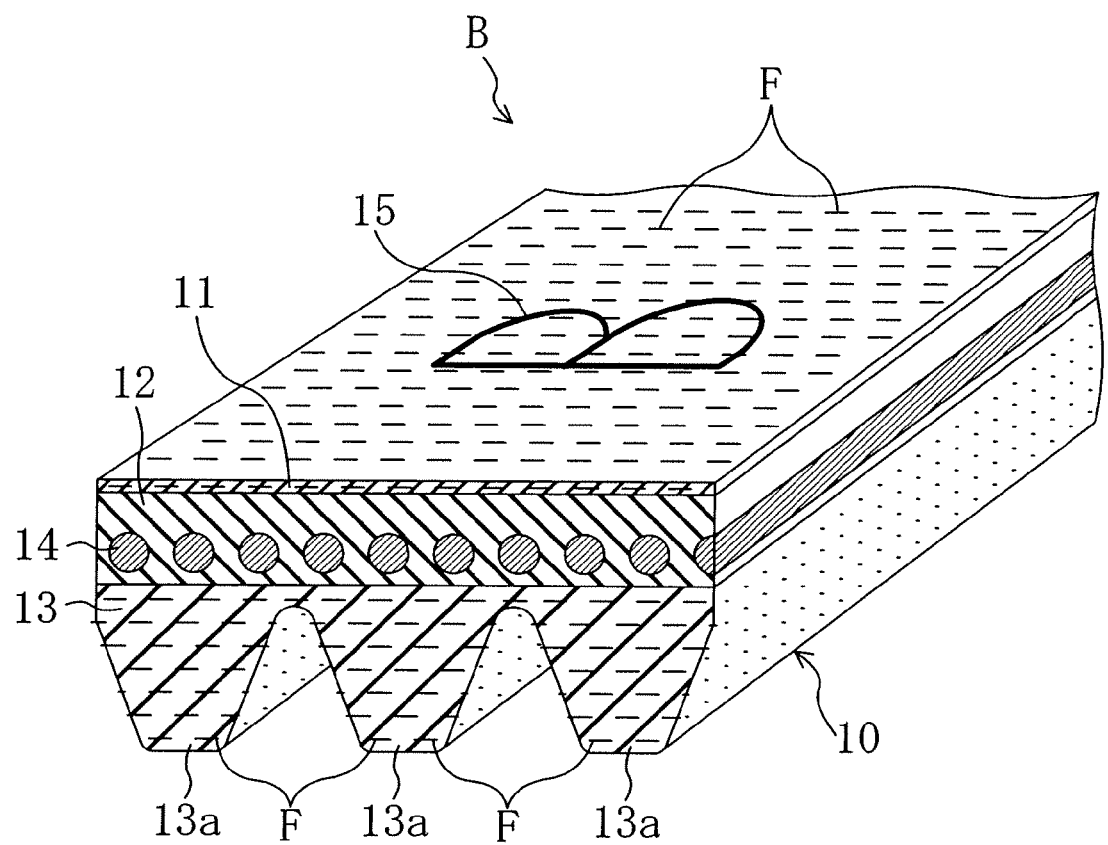
FIG. 1 is a perspective view of a V-ribbed belt.

(V-Ribbed Belt B)
FIG. 1 shows a V-ribbed belt B according to this embodiment. The V-ribbed belt B is used, for example, to transmit power from a motor vehicle engine to engine accessories to drive them and formed with a length of 1000 to 2500 mm, a width of 10 to 20 mm and a thickness of 4.0 to 5.0 mm.

The V-ribbed belt B includes a V-ribbed belt body 10 formed in a triple layered structure including a backing rubber layer 11 forming an outer part, an adhesion rubber layer 12 forming an intermediate part and a ribbed rubber layer 13 forming an inner part. The adhesion rubber layer 12 has a cord 14 embedded therein in a spiral with a certain pitch in the belt width direction.

The backing rubber layer 11 is formed in the shape of a small-thickness strip of long rectangular cross section and has a thickness of 0.30 to 2.00 mm, for example.

The backing rubber layer 11 is made of a rubber composition in which various compounding ingredients are blended into a base elastomer. Examples of the base elastomer include ethylene-propylene-diene monomer rubber (EPDM), chloroprene rubber (CR) and hydrogenated acrylonitrile-butadiene rubber (H-NBR). Examples of the compounding ingredients include crosslinkers, antioxidants, processing aids, plasticizers, reinforcers, fillers and short fibers F. The rubber composition forming the backing rubber layer 11 is obtained by blending compounding ingredients into a base elastomer and kneading them to form an uncrosslinked rubber composition and crosslinking the uncrosslinked rubber composition by application of heat and pressure.

The short fibers F, which are blended into the rubber composition forming the backing rubber layer 11, are oriented in a direction making an angle with the circumferential direction of the belt, such as the belt width direction. Examples of such short fibers F include aramid fibers, polyester fibers and cotton fibers. The short fibers F have a length of 0.2 to 3.0 mm, for example, and are blended by 3 to 30 parts by mass with respect to 100 parts by mass of the base elastomer.

The adhesion rubber layer 12 is formed in the shape of a thick strip of long rectangular cross section and has a thickness of 1.0 to 2.5 mm, for example.

The adhesion rubber layer 12 is made of a rubber composition in which various compounding ingredients are blended into a base elastomer. Examples of the base elastomer include ethylene-propylene-diene monomer rubber (EPDM), chloroprene rubber (CR) and hydrogenated acrylonitrile-butadiene rubber (H-NBR). Examples of the compounding ingredients include crosslinkers, antioxidants, processing aids, plasticizers, reinforcers and fillers. The rubber composition forming the adhesion rubber layer 12 is obtained by blending compounding ingredients into a base elastomer and kneading them to form an uncrosslinked rubber composition and crosslinking the uncrosslinked rubber composition by application of heat and pressure.

The ribbed rubber layer 13 is formed so that a plurality of ribs 13a forming a contact part with a pulley extend inward. The plurality of ribs 13a are each formed into a circumferentially extending rib of substantially inverted triangular cross section and are arranged in parallel with each other in the belt width direction. Each rib 13a is formed, for example, with a rib height of 2.0 to 3.0 mm and a width of 1.0 to 3.6 mm between its root ends. The number of ribs is three to six, for example, (three in FIG. 1).

The ribbed rubber layer 13 is made of a rubber composition in which various compounding ingredients are blended into a base elastomer. Examples of the base elastomer include ethylene-propylene-diene monomer rubber (EPDM), chloroprene rubber (CR) and hydrogenated acrylonitrile-butadiene rubber (H-NBR). Examples of the compounding ingredients include crosslinkers, antioxidants, processing aids, plasticizers, reinforcers, fillers and short fibers F. The rubber composition forming the ribbed rubber layer 13 is obtained by blending compounding ingredients into a base elastomer and kneading them to form an uncrosslinked rubber composition and crosslinking the uncrosslinked rubber composition by application of heat and pressure.

The short fibers F, which are blended into the rubber composition forming the ribbed rubber layer 13, are oriented in the belt width direction. Out of the short fibers F, those exposed at the contact surface with a pulley, i.e., at the surfaces of the ribs 13a, protrude beyond the surfaces of the ribs 13a. Examples of such short fibers F include aramid fibers, polyester fibers and cotton fibers. The short fibers F have a length of 0.2 to 3.0 mm, for example, and are blended by 3 to 30 parts by mass with respect to 100 parts by mass of the base elastomer.

The backing rubber layer 11, the adhesion rubber layer 12 and the ribbed rubber layer 13 may be made of different base elastomers but are preferably made of the same base elastomer in view of the interlayer adhesiveness. Furthermore, some of the backing rubber layer 11, the adhesion rubber layer 12 and the ribbed rubber layer 13 may be crosslinked with sulfur-based crosslinking agent and the rest crosslinked with peroxide-based crosslinking agent. However, in view of the interlayer adhesiveness, these rubber layers are preferably crosslinked with a crosslinking agent or agents of the same crosslinking type. The short fibers F contained in the backing rubber layer 11 may be of the same type as or different type from those contained in the ribbed rubber layer 13.

The cord 14 is composed of a twisted yarn, such as of aramid fibers or polyester fibers. In order to give the cord 14 an adhesiveness to the V-ribbed belt body 10, the cord 14 is subjected, prior to molding, to a treatment of dipping it in an RFL aqueous solution and then heating it and a treatment of dipping the cord 14 in rubber cement and then drying it.

Furthermore, a mark 15 indicating a manufacturer's name, a lot number and/or other information is hot transferred to the back face of the V-ribbed belt B.

Figure 2:
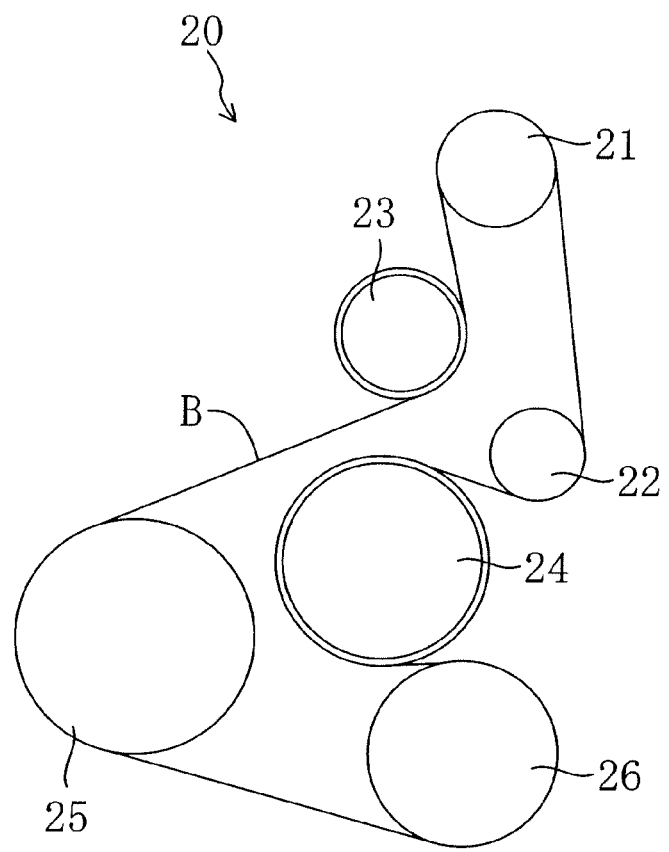
FIG. 2 is a diagram showing a layout of pulleys in an accessory drive belt drive system.

FIG. 2 shows a layout of pulleys in a serpentine accessory drive belt drive system 20 using a V-ribbed belt B for a motor vehicle engine.

The pulley layout of the accessory drive belt drive system 20 includes an uppermost power steering pulley 21, an AC generator pulley 22 disposed below the power steering pulley 21, a flat tensioner pulley 23 disposed leftward below the power steering pulley 21, a flat water pump pulley 24 disposed below the tensioner pulley 23, a crankshaft pulley 25 disposed leftward below the tensioner pulley 23, and an air-conditioner pulley 26 disposed rightward below the crankshaft pulley 25. Out of these pulleys, all the pulleys other than the tensioner pulley 23 and the water pump pulley 24, which are flat pulleys made of resin, are ribbed pulleys. The V-ribbed belt B is arranged by being wrapped around the power steering pulley 21 to allow its ribs 13a to come into contact with the power steering pulley 21, then wrapped around the tensioner pulley 23 to allow its back face to come into contact with the tensioner pulley 23, then sequentially wrapped around the crankshaft pulley 25 and the air-conditioner pulley 26 to allow its ribs 13a to come into contact with these pulleys, then wrapped around the water pump pulley 24 to allow its back face to come into contact with the water pump pulley 24, then wrapped around the AC generator pulley 22 to allow its ribs 13a to come into contact with the AC generator pulley 22, and then returned to the power steering pulley 21.

(Fabrication Method of V-Ribbed Belt B)

Next, a description is given of a method for fabricating the V-ribbed belt B with reference to FIGS. 3 to 10.

<Component Material Preparation Step>

—Backing Rubber Sheet—

A specified uncrosslinked rubber composition containing short fibers F is calendered into an uncrosslinked rubber sheet in which the short fibers F are oriented in the length direction of the sheet.

Figure 3:
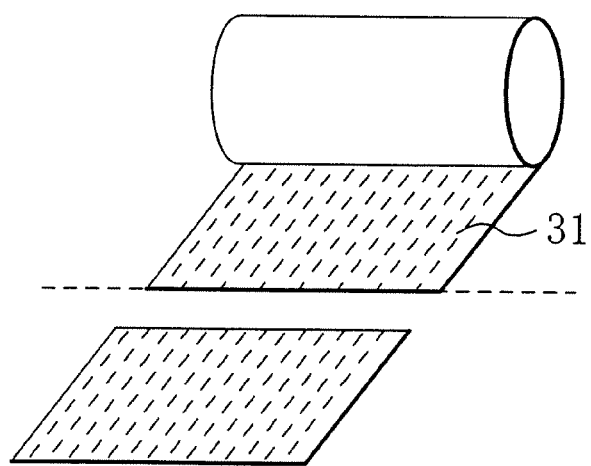
FIG. 3 is an illustration showing the step of forming a backing rubber sheet.
Figure 4:
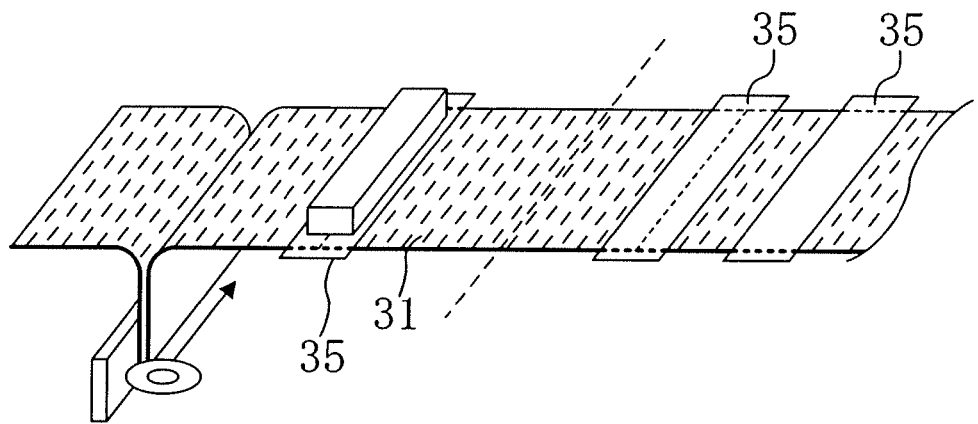
FIG. 4 is an illustration showing the step of adhering a mark hot-transfer sheet to the backing rubber sheet by hot pressing.

Next, as shown in FIG. 3, the uncrosslinked rubber sheet is bias cut into pieces and, as shown in FIG. 4, the cut pieces are then joined together, by ultrasonication or hot plate pressing, into a long backing rubber sheet 31 forming a backing rubber layer 11 so that the cut ends become side edges of the backing rubber sheet 31. In this case, the orientation of the short fibers F can be determined from the direction of bias cutting. For example, when the direction of bias cutting is a direction orthogonal to the orientation of the short fibers F, a backing rubber sheet 31 can be obtained in which short fibers F are oriented in the sheet width direction. When the direction of bias cutting is a direction making an angle of 45° with the orientation of the short fibers F, a backing rubber sheet 31 can be obtained in which short fibers F are oriented in a direction at 45° to the sheet length direction.

Next, as shown in FIG. 4, elongated mark hot-transfer sheets 35 are placed on the rubber junctures of one side of the backing rubber sheet 31 to cover the rubber junctures and adhered to the backing rubber sheet 31 by hot pressing (sheet hot-pressing step).

The mark hot-transfer sheet 35 is a sheet in which a specified mark is placed in an inverted pattern on one side of a heat-resistant resin film, such as with a colored uncrosslinked rubber composition mixed with pigment. The side of the mark hot-transfer sheet 35 on which the mark is placed may be covered, as with a pressure-sensitive adhesive layer facilitating adhesion by hot pressing of the mark to the backing rubber sheet 31.

Figure 5:
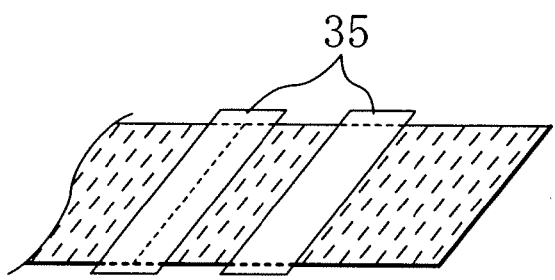
FIG. 5 is an illustration showing the step of cutting the backing rubber sheet to a predetermined length.
Figure 6:
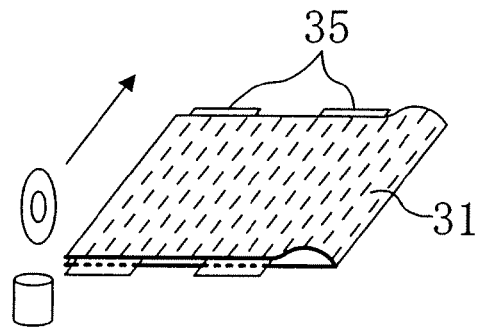
FIG. 6 is an illustration showing the step of forming a cylindrical rubber.

Then, as shown in FIG. 5, the backing rubber sheet 31 is cut to a length slightly shorter than the outer peripheral length of the below-described cylindrical mold 40 and, as shown in FIG. 6, the cut piece is joined at the cut ends into a cylindrical rubber 31a by ultrasonication or hot plate pressing so that the side thereof having the mark hot-transfer sheet 35 becomes the inside of the cylindrical rubber 31a (cylindrical rubber formation step). A mark hot-transfer sheet 35 is preferably adhered by hot pressing also to the rubber juncture formed at this time from the inside surface of the cylindrical rubber 31a.

The adhesion of the mark hot-transfer sheets 35 by hot pressing may be carried out prior to the formation of the cylindrical rubber 31a from the backing rubber sheet 31 as described above or may be carried out after the formation of the cylindrical rubber 31a.

—Adhesion Rubber Sheet—

A specified uncrosslinked rubber composition is calendered into a long adhesion rubber sheet 32 forming an adhesion rubber layer 12.

—Ribbed Rubber Sheet—

A specified uncrosslinked rubber composition containing short fibers F is calendered into an uncrosslinked rubber sheet in which the short fibers F are oriented in the length direction of the sheet.

Next, the uncrosslinked rubber sheet is bias cut in a direction orthogonal to the orientation of the short fibers F into pieces and the cut pieces are then joined together, by ultrasonication or hot plate pressing, into a long ribbed rubber sheet 33 forming a ribbed rubber layer 13 so that the cut ends become side edges of the ribbed rubber sheet 33. In the ribbed rubber sheet 33, the short fibers F are oriented in the width direction of the sheet.

—Twisted Yarn for Cord—

A twisted yarn, such as of aramid fibers or polyester fibers, is subjected to a treatment of dipping it in an RFL aqueous solution and then heating it and, if necessary, a treatment of dipping it in rubber cement and then drying it, thereby forming it into a cord-oriented twisted yarn 34 constituting a cord 14.

<Component Material Setting Step>

Figure 7:
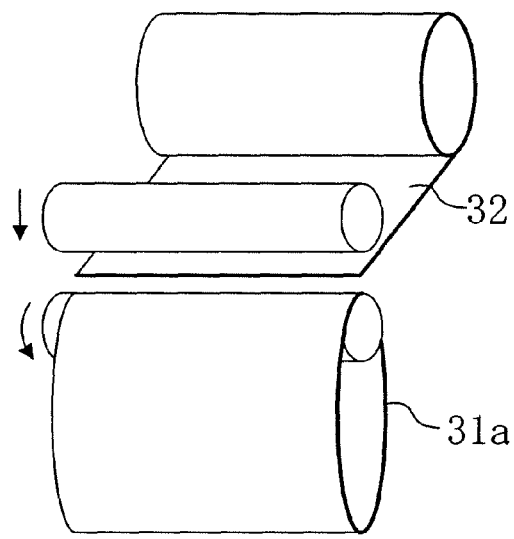
FIG. 7 is an illustration showing the step of wrapping an adhesion rubber sheet around the cylindrical rubber.

As shown in FIG. 7, the cylindrical rubber 31a formed from the backing rubber sheet 31 is threaded about one of a pair of rollers and the adhesion rubber sheet 32 is pressed, with its width direction aligned with the axial direction of the cylindrical rubber 31a, against the cylindrical rubber 31a by the other roller to wrap and lay the adhesion rubber sheet 32 in a single turn around the cylindrical rubber 31a along its circumference (rubber sheet wrapping step). In this case, the adhesion rubber sheet 32 is butt-joined at both ends so that its juncture does not overlap with the rubber juncture of the cylindrical rubber 31a.

Figure 8:
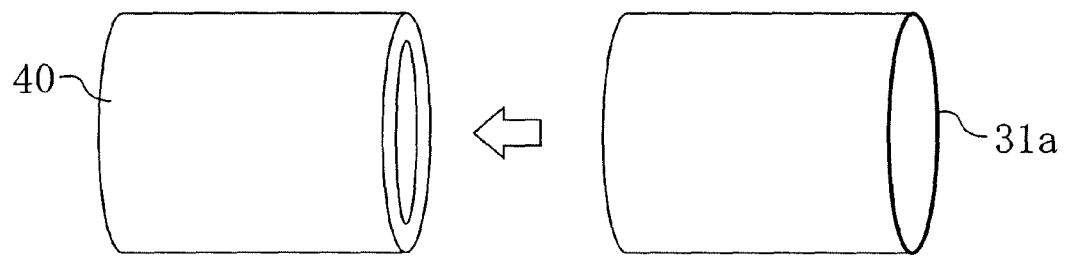
FIG. 8 is an illustration showing the step of covering a cylindrical mold with the cylindrical rubber.

Next, as shown in FIG. 8, a cylindrical mold 40 is covered with the cylindrical rubber 31a around which the adhesion rubber sheet 32 is laid (mold covering step). In this case, since the inner peripheral length of the cylindrical rubber 31a is shorter (for example, by 0.25% to 5.00%) than the outer peripheral length of the cylindrical mold 40, the cylindrical rubber 31a is circumferentially stretched. However, since the mark hot-transfer sheet 35 is adhered by hot pressing to the juncture of the cylindrical rubber 31a, it performs the function of reinforcing the juncture of the cylindrical rubber 31a in addition to the original purpose. As a result, the juncture of the cylindrical rubber 31a can be prevented from being broken.

Figure 9:
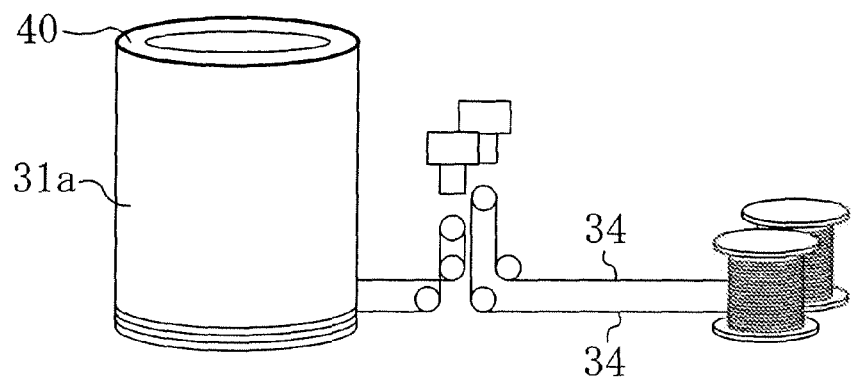
FIG. 9 is an illustration showing the step of winding a twisted yarn for a cord.

Next, as shown in FIG. 9, the twisted yarn 34 for a cord is spirally wound around the cylindrical rubber 31a, another adhesion rubber sheet 32 is then wrapped and laid in a single turn around it along its circumference and the ribbed rubber sheet 33 is then wrapped and laid in plural turns around it along its circumference.

Figure 10:
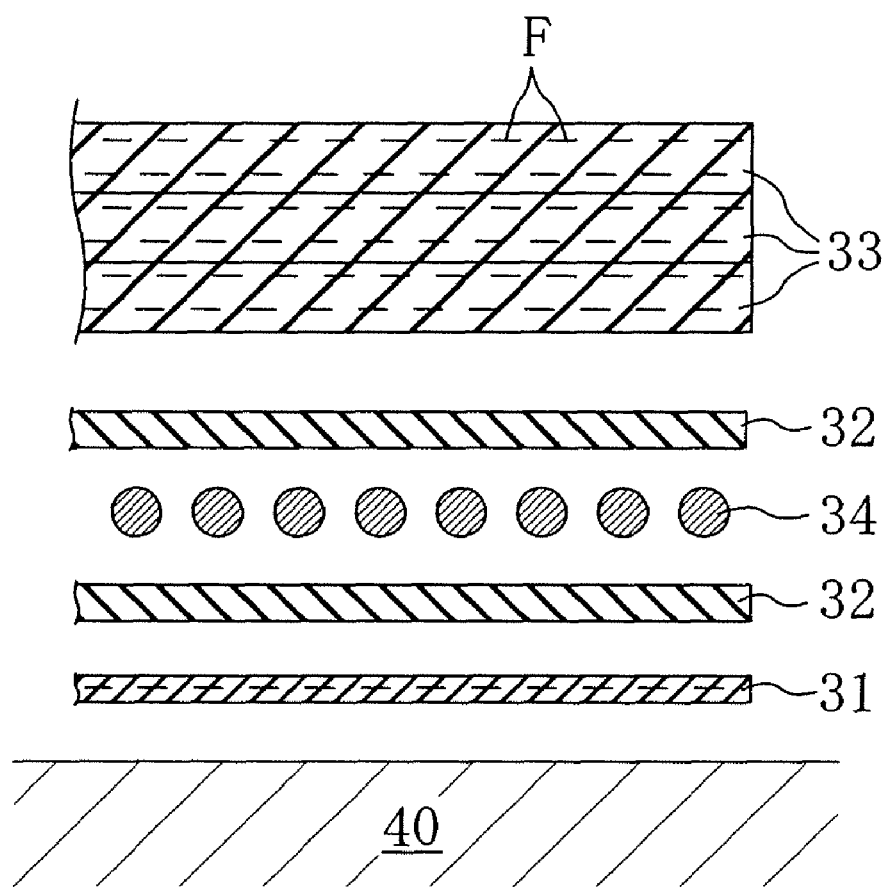
FIG. 10 is an illustration showing the state in which belt component materials are set around the outer periphery of the cylindrical mold.

In this manner, as shown in FIG. 10, the component materials are set on the outer periphery of the cylindrical mold 40 by laying them one on another in order of the backing rubber sheet 31, the adhesion rubber sheet 32, the twisted yarn 34 for a cord, the other adhesion rubber sheet 32 and the ribbed rubber sheet 33.

The laying of the adhesion rubber sheet 32 on the cylindrical rubber 31a may be carried out prior to the covering of the cylindrical mold 40 with the cylindrical rubber 31a as described above or may be carried out after the covering. However, in view of reinforcement of the juncture of the cylindrical rubber 31a, the above laying of the adhesion rubber sheet 32 is preferably carried out prior to the covering of the cylindrical mold 40 with the cylindrical rubber 31a.

<Crosslinking Molding Step>

The cylindrical mold 40 on the outer periphery of which the component materials are set is fitted into a cylindrical rubber sleeve placed in a molding pan. Then, in the molding pan, the cylindrical mold 40 is heated as by hot steam and a high pressure is applied to the rubber sleeve to press it radially inwardly. During the pressing, the rubber component fluidizes, a crosslinking reaction proceeds and an adhesion reaction of the twisted yarn to the rubber also proceeds. Thus, a cylindrical belt slab is molded. In addition, the marks of the mark hot-transfer sheets 35 are transferred to the inside of the belt slab.

<Cutting and Finishing Step>

The belt slab is removed from the cylindrical mold 40 and then cut and separated into several round pieces, and the outer periphery of each separated piece is circumferentially ground to form ribs 13a.

Finally, the separated belt slab piece having ribs 13a formed on the outer periphery is sliced in pieces of predetermined width and each sliced piece is turned inside out to provide a V-ribbed belt B.

Although in the above embodiment the V-ribbed belt B is used as an example of a drive belt according to the present invention, the drive belt according to the present invention is not particularly limited to V-ribbed belts and may be other types of drive belts, such as V-belts.

INDUSTRIAL APPLICABILITY

The present invention is useful for a method for fabricating a drive belt.

The invention claimed is:

1. A method for fabricating a drive belt, comprising
a cylindrical rubber formation step of forming a cylindrical rubber by roundly joining an uncrosslinked rubber sheet to form a juncture and
a mold covering step of covering a cylindrical mold with the cylindrical rubber formed in the cylindrical rubber formation step, and
a sheet hot-pressing step of adhering a mark hot-transfer sheet including a resin film on which a mark has been placed over the juncture of the cylindrical rubber by hot pressing so that the mark hot-transfer sheet covers the juncture on the inside of the cylindrical rubber, wherein in the mold covering step, the cylindrical rubber is formed so that the inner peripheral length thereof is 0.25% to 5.00% shorter than the outer peripheral length of the cylindrical mold, and the cylindrical mold is covered with the cylindrical rubber with the mark hot-transfer sheet provided over the juncture of the cylindrical rubber in order to mechanically reinforce the juncture.

2. The method for fabricating a drive belt of claim 1, wherein the uncrosslinked rubber sheet is formed from a plurality of uncrosslinked rubber sheets that have been joined together at a previously made juncture prior to the cylindrical rubber formation step, and a sheet hot-pressing step is carried out on the previously made juncture prior to the cylindrical rubber formation step.

3. The method for fabricating a drive belt of claim 1, wherein the uncrosslinked rubber sheet is formed from a plurality of uncrosslinked rubber sheets that have been joined together at a previously made juncture prior to the cylindrical rubber formation step, and a sheet hot-pressing step is carried out on the previously made juncture after the cylindrical rubber formation step and before the mold covering step.

4. The method for fabricating a drive belt of claim 1, further comprising, between the cylindrical rubber formation step and the mold covering step, a rubber sheet wrapping step of wrapping and laying another uncrosslinked rubber sheet around the outer periphery of the cylindrical rubber.

5. A method for fabricating a drive belt, comprising:
an uncrosslinked rubber sheet forming step that includes cutting a continuous uncrosslinked rubber sheet into a plurality of uncrosslinked rubber sheet sections and joining the edges of the plurality of uncrosslinked rubber sheet sections to form a single uncrosslinked rubber sheet having a first juncture;

a rubber sheet hot-pressing step of adhering a mark hot-transfer sheet including a resin film on which a mark has been placed over the first juncture of the single uncrosslinked rubber sheet by hot pressing so that the mark hot-transfer sheet covers the first juncture;

a cylindrical rubber formation step of forming a cylindrical rubber by roundly joining the single uncrosslinked rubber sheet to form a second juncture;

a cylindrical rubber hot-pressing step of adhering a mark hot-transfer sheet including a resin film on which a mark has been placed over the second juncture of the cylindrical rubber by hot pressing so that the mark hot-transfer sheet covers the second juncture on the inside of the cylindrical rubber, and a mold covering step of covering a cylindrical mold with the cylindrical rubber formed in the cylindrical rubber formation step, wherein the cylindrical rubber is formed so that the inner peripheral length thereof is 0.25% to 5.00% shorter than the outer peripheral length of the cylindrical mold, the cylindrical mold is covered with the cylindrical rubber with mark hot-transfer sheets provided over the first and second junctures in the cylindrical rubber in order to mechanically reinforce the junctures.

6. The method for fabricating a drive belt of claim 5, wherein the rubber sheet hot-pressing step is carried out prior to the cylindrical rubber formation step.

7. The method for fabricating a drive belt of claim 5, wherein the rubber sheet hot-pressing step is carried out after the cylindrical rubber formation step.

8. The method for fabricating a drive belt of claim 1, wherein the uncrosslinked rubber sheet is formed from a low tack rubber material.

* * * * *